United States Patent
McBride et al.

(10) Patent No.: US 9,516,026 B2
(45) Date of Patent: Dec. 6, 2016

(54) NETWORK SERVICES INFRASTRUCTURE SYSTEMS AND METHODS

(71) Applicant: ALCATEL LUCENT, Boulogne-Billancourt (FR)

(72) Inventors: Brian McBride, Carp (CA); Bashar Said Bou-Diab, Dubai (AE); Laura Mihaela Serghi, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 180 days.

(21) Appl. No.: 14/318,963

(22) Filed: Jun. 30, 2014

(65) Prior Publication Data

US 2014/0317683 A1    Oct. 23, 2014

Related U.S. Application Data

(63) Continuation of application No. 11/105,732, filed on Apr. 14, 2005, now abandoned.

(51) Int. Cl.
*H04L 29/06* (2006.01)
*H04L 29/08* (2006.01)
*H04L 12/24* (2006.01)

(52) U.S. Cl.
CPC ............... *H04L 63/10* (2013.01); *H04L 41/28* (2013.01); *H04L 63/20* (2013.01); *H04L 67/02* (2013.01); *H04L 67/20* (2013.01)

(58) Field of Classification Search
None
See application file for complete search history.

(56) References Cited

U.S. PATENT DOCUMENTS

| | | | |
|---|---|---|---|
| 6,081,900 A | 6/2000 | Subramaniam et al. |
| 7,127,700 B2 | 10/2006 | Large |
| 7,457,870 B1 | 11/2008 | Lownsbrough et al. |
| 7,463,637 B2 | 12/2008 | Bou-Diab et al. |
| 7,483,438 B2 | 1/2009 | Serghi et al. |
| 7,698,398 B1 | 4/2010 | Lai |
| 2002/0143819 A1 | 10/2002 | Han et al. |

(Continued)

FOREIGN PATENT DOCUMENTS

| | | |
|---|---|---|
| WO | 03091895 A2 | 11/2003 |
| WO | 03091895 A3 | 11/2003 |

OTHER PUBLICATIONS

European Patent Office, "extended European search report", Dec. 14, 2012, 6 pp.

(Continued)

*Primary Examiner* — Sulaiman Nooristany
(74) *Attorney, Agent, or Firm* — Kramer & Amado, P.C.

(57) ABSTRACT

Network services infrastructure systems and methods are disclosed. Policies for client access to a services network and network services available in the services network are enforced at client gateways. Once authenticated and authorized at a client gateway, a client of the services network may make its own network service(s) available in the services network, use network services provided by other clients of the services network, or both. The policies are centrally managed within a services network and distributed to the client gateways. Various registries which store policies, information associated with network services, and possibly other information may also be provided.

28 Claims, 4 Drawing Sheets

(56) References Cited

U.S. PATENT DOCUMENTS

| | | | |
|---|---|---|---|
| 2003/0099237 A1* | 5/2003 | Mitra | H04L 45/00 370/393 |
| 2003/0214955 A1* | 11/2003 | Kim | H04L 12/4633 370/400 |
| 2004/0078424 A1 | 4/2004 | Yairi et al. | |
| 2004/0107196 A1 | 6/2004 | Chen et al. | |
| 2004/0128622 A1 | 7/2004 | Mountain et al. | |
| 2004/0242329 A1 | 12/2004 | Blackburn et al. | |
| 2004/0268121 A1* | 12/2004 | Shelest | H04L 63/0272 713/156 |
| 2005/0005116 A1 | 1/2005 | Kasi et al. | |
| 2005/0086197 A1 | 4/2005 | Boubez et al. | |
| 2005/0228984 A1 | 10/2005 | Edery et al. | |
| 2005/0273668 A1 | 12/2005 | Manning | |
| 2006/0047832 A1* | 3/2006 | Betts | H04L 12/22 709/229 |
| 2006/0080352 A1 | 4/2006 | Boubez et al. | |
| 2006/0080419 A1 | 4/2006 | Patrick et al. | |
| 2006/0161616 A1 | 7/2006 | I'Anson et al. | |
| 2007/0124423 A1 | 5/2007 | Berkland et al. | |

OTHER PUBLICATIONS

Rosenberg, J. et al., "SIP for Presence", Internet Citation, [Online], Nov. 13, 1998, XP-002173451, Retrieved from the Internet: URL: http//www.alternic.org.

M. Hondo et al., "Securing Web Services", IBM Systems Journal, 2002, pp. 228-241, vol. 41, No. 2, IBM Corporation, Armonk, New York, United States of America.

U.S. Advisory Action issued Dec. 16, 2008 with respect to U.S. Appl. No. 11/105,732 (3 pages).

U.S. Office Action issued Feb. 19, 2008 with respect to U.S. Appl. No. 11/105,732 (33 pages).

U.S. Final office Action issued Sep. 8, 2008 with respect to U.S. Appl. No. 11/105,732 (36 pages).

U.S. Office Action issued Mar. 17, 2009 with respect to U.S. Appl. No. 11/105,732 (23 pages).

U.S. Final Office Action issued Nov. 17, 2009 with respect to U.S. Appl. No. 11/105,732 (24 pages).

U.S. Advisory Action issued Feb. 16, 2010 with respect to U.S. Appl. No. 11/105,732 (3 pages).

U.S. Office Action issued Jul. 30, 2010 with respect to U.S. Appl. No. 11/105,732 (25 pages).

U.S. Final Office Action issued Jan. 3, 2011 with respect to U.S. Appl. No. 11/105,732 (26 pages).

U.S. Advisory Action issued Mar. 17, 2011 with respect to U.S. Appl. No. 11/105,732 (3 pages).

U.S. Office Action issued Aug. 10, 2011 with respect to U.S. Appl. No. 11/105,732 (26 pages).

U.S. Final Office Action issued Mar. 19, 2012 with respect to U.S. Appl. No. 11/105,732 (26 pages).

U.S. Final Office Action issued Oct. 7, 2013 with respect to U.S. Appl. No. 11/105,732 (25 pages).

U.S. Office Action issued Mar. 11, 2013 with respect to U.S. Appl. No. 11/105,732 (24 pages).

U.S. Notice of Allowance issued Apr. 8, 2014 with respect to U.S. Appl. No. 11/105,732 (8 pages).

* cited by examiner

NETWORK SERVICES INFRASTRUCTURE SYSTEMS AND METHODS

CROSS-REFERENCE TO RELATED APPLICATIONS

This application is a continuation of U.S. patent application Ser. No. 11/105,732 filed on Apr. 14, 2005, the entire contents of which are incorporated in their entirety herein by reference.

The present application is related to U.S. patent application Ser. No. 11/105,601, filed on Apr. 14, 2005, entitled "PUBLIC AND PRIVATE NETWORK SERVICE MANAGEMENT SYSTEMS AND METHODS" and issued as U.S. Pat. No. 7,463,637; and Ser. No. 11/105,821, filed on Apr. 14, 2005, entitled "SYSTEMS AND METHODS FOR MANAGING NETWORK SERVICES BETWEEN PRIVATE NETWORKS" and issued as U.S. Pat. No. 7,483,438, the entire contents of both of which are incorporated herein by reference.

FIELD OF THE INVENTION

This invention relates generally to network services and, in particular, to infrastructures for providing network services.

BACKGROUND

Services for which information is distributed through a communication network are generally referred to as network services. So-called "web services" are an example of network services, and represent the next generation of web-based technology being used for automatically exchanging information between different applications over the public Internet network.

Web services are the framework for building web-based distributed applications over the Internet. They provide efficient and effective automated machine to machine communication between multiple global enterprises. This automation is bringing technology based process and business efficiencies from technology companies to world leading non-technology companies such as retail companies. Whereas purchase orders might cost $120 to process using conventional processing techniques, with suppliers taking days to process restocking orders that sit in warehouses, new web services-based systems can do the same for half a cent, and orders are distributed to warehouses across the globe in seconds.

From the technology point of view, web services are similar to application services, in the sense that they are network accessible functions that can be accessed using standard Internet protocols such as HyperText Transfer Protocol (HTTP), eXtensible Markup Language (XML), Simple Object Access Protocol (SOAP), etc., over standard interfaces.

Web services applications are built with pieces of code and data that may come from anywhere in the public Internet. For example, in automated supply chain management, store front purchases are cleared by monetary agents, restocking orders are sent directly to the factories, and billing information is collected by head offices, each with their own software systems.

The real power of web services technology is in its simplicity. The core technology only addresses the common language and communication issues and does not directly address the onerous task of application integration. Web services can be viewed as a sophisticated machine to machine Remote Procedure Call (RPC) technology for interconnecting multiple heterogeneous untrusted systems. Web services takes the best of many new technologies by utilizing XML technology for data conversion/transparency and Internet standards such as HyperText Transfer Protocol (HTPP) for communication.

Web services have already proven themselves successful in the enterprise private network space, gaining rapid acceptance as the standard way for applications to communicate. Most current web services, however, are hosted by application servers which are located behind firewalls in corporate enterprise networks.

Efforts to support web services interactions within and beyond the enterprise space over the basic Internet infrastructure have concentrated on ad-hoc approaches. According to one approach, different enterprises between which web services were to be offered had to agree on using compatible applications, common proprietary software, custom interfaces and APIs, and common communication protocols. Enterprises also had to agree on data security and the way any secure communications were to be managed. In addition, each enterprise had to open their internal firewalls to let business traffic flow between applications in a point-to-point manner.

Adding new web services business partners in an enterprise environment has always been a difficult, expensive, and time consuming process, since potential new business partners tend to have different sets of rules and standards. Modifications to a new partner's applications and custom code revisions to the enterprise offering the new applications are often required.

There are currently no known deployment and management solutions for deploying and managing an end-to-end virtual (private) extranet web service architecture, targeting a communication network provider's space as opposed to enterprise space. For example, although XML Virtual Private Network (VPN) devices exist, these devices are intended for implementation in enterprise networks behind firewalls.

Existing software-based security products which address the provider's core market, or smaller-capacity hardware-based enterprise class products, do not scale to core network requirements, where a large number of enterprises with various policy/security/admission control requirements might wish to provide or consume web services through the same core network. Enterprise-class products, including server-based architectures and hardware XML devices, also do not typically satisfy the high availability and speed requirements of communication network core equipment.

SUMMARY OF THE INVENTION

Embodiments of the present invention provide a new network service enabling a specific communication network service provider to offer network services, illustratively web services, as network-resident services.

In some embodiments, this new network service is provided in a so-called extranet service architecture. The extranet architecture envisions a "network of services" offered to a closed group of members while being administered by a network service provider. The extranet service model is preferably an application layer solution, an overlay network built on top of a network provider's infrastructure.

According to an aspect of the invention, an apparatus for providing network services in a services network includes a policy enforcement module which is configured to enforce rules for client access to the services network in accordance with an authentication policy of the services network and to allow an authenticated client to access the services network to make a network service provided by the client available to another client of the services network, to use a network service provided by another client of the services network, or to both make a network service provided by the client available to another client of the private services network and use a network service provided by another client of the services network.

The policy enforcement module may be further configured to allow the authenticated client to make the network service available to any other client in the services network and to use a network service provided by another client according to respective service policies associated with the network services.

The apparatus may also include a security module for enforcing secure end to end communication, between the authenticated client and the services network, within the services network and between services network and a destination client of the services network.

In some embodiments, the security module applies authentication and authorization actions based on the rules to communication traffic, and passes or drops the communication traffic responsive to the authentication and authorization actions. Additional security rules may also be applied to communication traffic.

The apparatus may also include a Simple Object Access Protocol (SOAP) proxy module operatively coupled to the policy enforcement module and configured to classify traffic associated with the authenticated client as control traffic or data traffic, to transmit control traffic comprising information associated with the network service provided by the authenticated client for publication in a services registry, and to modify SOAP information in data traffic for further processing.

A Universal Description, Discovery, and Integration (UDDI) proxy module may also be operatively coupled to the SOAP proxy module. In this case, the SOAP proxy module is further configured to identify received UDDI control traffic, and to forward the received UDDI control traffic to the UDDI proxy module for further processing. The received UDDI control traffic may include requests for network services lookups. The UDDI proxy module handles local or remote resolution of the requests and responds to a client which initiated each request.

A service handling module may also be operatively coupled to the SOAP proxy module and configured to exchange data traffic with the SOAP proxy module.

The policy enforcement module may allow the authenticated client to publish information associated with the network service to a services registry, and to access the services registry to use a network service provided by another client. The information associated with the network service may include access information specifying access rules for the network service for use by other members of the services network. Access to information associated with a network service provided by another client of the services network from the services registry is controlled by the policy enforcement module in accordance with access rules specified by that other client.

A forwarding/routing module, which is provided in some embodiments, routes communication traffic in the services network and supports at least one of: a layer 1 forwarding method, a layer 2 forwarding method, Internet Protocol (IP) routing, and eXtensible Markup Language (XML) routing.

Other functions, such as converting communication traffic between respective formats for transfer to the authenticated client and to the services network in accordance with a transform policy of the services network, may also be performed or managed by the policy enforcement module.

The apparatus may be implemented, for example, in a client gateway of a communication system which provides a services network. A network controller of the system is operatively coupled to the client gateway for managing the policies enforced by the client gateway and a registry of available network services.

An apparatus for managing policies associated with network services available in a services network is also provided, and includes a client gateway interface to be operatively coupled to a client gateway through which a client of the services network accesses the services network, and a policy manager. The policy manager is operatively coupled to the client gateway interface and configured to distribute network service policies specifying access controls for respective network services to the client gateway through the client gateway interface to cause the client gateway to control access to the network services by the client of the services network in accordance with the network service policies.

The policy manager may also manage at least one of: authentication of clients with the services network, and format transformations to be applied to data traffic by the client gateway.

In some embodiments, the network service policies include policies stored in a network service policies registry, and the policy manager is further configured to maintain the network service policies registry, and to integrate into the network service policies registry an existing network service policy received from a client of the services network by which a network service is provided.

The apparatus may also include any or all of: a security manager operatively coupled to the client gateway interface and configured to manage security of client communications through the services network, a registries manager operatively coupled to the client gateway interface and configured to manage at least one of: a registry of network services available in the services network, service timeout information, eXtensible Markup Language (XML) schemas, service contracts, Quality of Service (QoS) parameters, subscription information, addressing information, billing information, Service Level Agreement (SLA) monitoring information, transactional network service activity monitoring information, activity logs, performance auditing information, and exception alerts, and a system manager operatively coupled to the client gateway interface and configured to receive and manage audit records captured by the client gateway.

The policy management apparatus may be implemented, for instance in a network controller of a communication system which provides a services network in which private network services provided by network service providers are made accessible to network service consumers through client gateways.

An apparatus for managing network services available in a services network is also provided according to another aspect of the invention, and includes a client gateway interface to be operatively coupled to a client gateway through which a client of the services network accesses the services network, and a registry manager operatively coupled to the client gateway interface and configured to receive from the client gateway requests regarding information in a services registry and provide requested information responsive thereto, to receive from the client gateway information associated with a network service to be made available in the services network and publish the received information in the services registry, and to receive from the client gateway subscriptions for modifications of the information in the services registry associated with the network and send notifications of the modifications responsive to the subscriptions.

In some embodiments, a communication system includes a network controller comprising the apparatus, a memory operatively coupled to the network controller for storing the services registry, and a client gateway operatively coupled to at least one client of the services network and to the memory, the client gateway being configured to control access to the network services published in the services registry by the at least one client.

A method of providing network services in a services network, according to yet another aspect of the invention, includes authenticating and authorizing a client of the private services network and, where the client has been authorized, making a network service provided by the client available in the services network or allowing the client to access the services network to use a specific network service or group of network services provided by another client of the services network for which the client has been authorized.

The operation of making a network service available may include initiating a connection with the services network for services publication. The operation of allowing the client to access the services network may include allowing the client to use a targeted network service by initiating a connection with the targeted network service and sending requests to and receiving replies from the targeted service. The operation of allowing may also include allowing the client to consult a registry of network services to access information for the specific network service or group of network services or to subscribe to changes at the registry level for the specific network service or group of network services.

Network service availability may be controlled in accordance with a service policy of the network service. In this case, allowing may include determining network services having associated service policies which permit use by the client.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
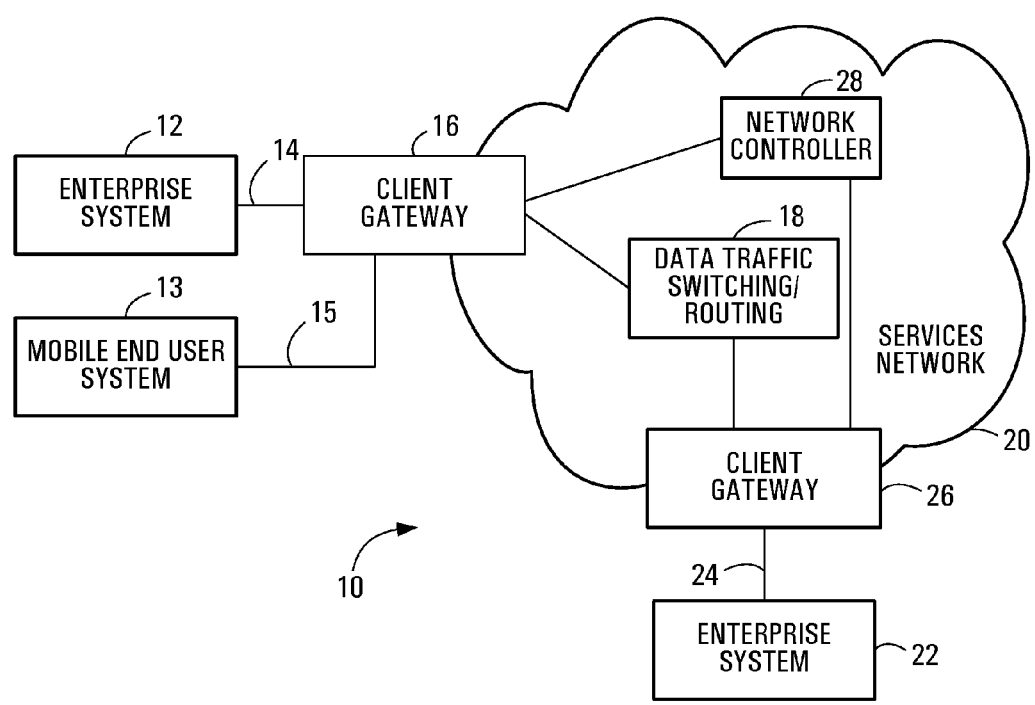
FIG. 1 is a block diagram of a communication system incorporating an embodiment of the invention.

FIG. 1 is a block diagram of a communication system incorporating an embodiment of the invention. The communication system 10 includes enterprise systems 12, 22, a mobile end user system 13, client gateways 16, 26, a services network 20, data traffic switching and routing components generally designated 18, and a network controller 28.

Although many enterprise systems 12, 22 and/or end user systems such as the mobile end user system 13, can be connected to a client gateway 16, 26 and also, many client gateways 16, 26 may reside at the border of the services network 20, only representative examples of each of these components have been shown in FIG. 1 to avoid congestion. Implementations in which only a single enterprise system 12, 22 and a single client gateway 16, 26 are provided, when the services network 20 is first deployed, for example, are also contemplated. It should therefore be appreciated that the system of FIG. 1, as well as the contents of the other drawings, are intended solely for illustrative purposes, and that the present invention is in no way limited to the particular example embodiments explicitly shown in the drawings and described herein.

The enterprise systems 12, 22 represent networks which may provide, use, or both provide and use, web services applications, offered and managed throughout the services network 20. In a typical installation, an enterprise system includes such components as a firewall to provide external access control and filter external traffic entering the enterprise, traffic switching and routing equipment, one or more servers for supporting network services, and user terminals, illustratively personal computers. A corporate private network is one example of an enterprise system 12.

The mobile end user system 13 is illustrative of an client system which is not part of a specific enterprise system. End user systems may be mobile, as shown, or fixed. The mobile end user system 13 may be connected to the client gateway 16 through a web services mobile gateway, for example. A mobile end user system 13, as well as fixed end user systems, may instead be physically connected to a client gateway 16. A portable computer system is mobile in the sense that it may connect to a client gateway through different locations and physical connections in an access network.

Those skilled in the art will be familiar with many different types of enterprise system and end user system which provide and/or use network services. Embodiments of the present invention relate primarily to offering and using such enterprise network services outside an enterprise environment, as opposed to how these services are actually supported in the enterprise systems 12, 22 or used in end user systems such as the mobile end user system 13, and accordingly the enterprise systems 12, 22, the mobile client system 13, and their operation are described only briefly herein to the extent necessary to appreciate aspects of the invention.

A virtual extranet service portal, which may be implemented as a software application for instance, in the enterprise systems 12, 22 and the mobile end user system 13, allow end network service providers and consumers to interact with the services network 20. A service portal allows users to log into the services network and authenticate themselves with the services network by means of federated identity or another authentication scheme, and may also enable other additional capabilities such as displaying various services lists, descriptions, etc., without substantially affecting how an end user provides and/or consumes network services.

The connections 14, 15, 24 may be direct connections as shown in FIG. 1, or indirect connections which traverse intermediate components and possibly other communication networks generally referred to herein as access networks.

However, the present invention is not restricted to network connections, or any other particular type of connection, between the enterprise systems 12, 22, the mobile end user system 13, and the client gateways 16, 26. The connections 14, 15, 24 may thus include any of direct, indirect, wired, and wireless connections.

Access to the services network 20 is provided for the enterprise systems 12, 22 and the mobile end user system 13 by the client gateways 16, 26. The client gateways 16, 26 are edge devices into the services network provider infrastructure, and represent gateways into the virtual extranet service provided by the services network 20. Each client gateway 16, 26 is in essence a secure network service proxy appliance for implementing a web service gateway function, supporting proxies for network services and XML "standards", for example, as well as new features. According to one embodiment, the client gateways 16, 26 are high-performance devices implemented at least in part using hardware, and are configured for operation as disclosed herein with embedded software for deployment by a services network provider. An illustrative example of a client gateway 16, 26 is described in detail below with reference to FIG. 2.

It will be apparent from the foregoing that two types of service provider are involved in the system 10. Network services are provided by one or both of the enterprise systems 12, 22. The services network 20 is provided by another service provider. A network service provider, for the enterprise system, thus offers network services, and a provider of the services network 20 provides, to a network service provider, another service which implements a network of services within which a network service provider may make its network service(s) available for use by network service consumers which are outside its own private system. A provider of a network service is referred to herein primarily as a network service provider, whereas a provider of the services network 20 is referred to primarily as a services network provider. Thus, a network service provider provides one or more network services, and a services network provider allows these network services to be managed internally and offered externally, illustratively in a virtual extranet service model. In many implementations, it is expected that the services network provider will also own or operate the underlying communication network on which the services network is built, although this need not necessarily be the case in all embodiments of the invention.

The network controller 28 provides control plane functionality of a service manager, and may be implemented as a network scale device, illustratively as a dedicated card for edge routers or a dedicated XML appliance, to be deployed by an operator of a communication network. It is used for managing the virtual extranet service, for hosting the central repository for all web services published within the virtual extranet, policies, service level agreements (SLAB), other network monitoring data, and to secure, manage, provision and store policies for end-to-end network services applications. The network controller 28, like the client gateways 16, 26, is described in further detail below, by way of illustrative example with reference to FIG. 3.

Data traffic traverses the services network 20 through the client gateways 16, 26 and data switching and/or routing equipment which is designated generally at 18. Whereas control/management traffic is handled by the network controller 28, data traffic is processed by the client gateways 16, 26 and from there, by the switching/routing components 18.

The services network 20 may be implemented as a virtual extranet architecture. In one embodiment, the virtual extranet represents an application overlay network built over a basic network provider infrastructure, as a sort of private-managed services network which uses, for example, Internet technology and underlying Layer 1, 2, 3, and 4 technologies to securely share part of an enterprise's information or operations with multiple enterprises, including suppliers, vendors, partners, customers, or other businesses for instance.

An overlay network in this case represents a virtual network fabric which may be implemented using layer 1 or 2 forwarding, IP routing and/or application level routing, illustrated by XML router devices. A virtual extranet network may provide connectivity and mechanisms for synchronous communications, e.g. REQUEST/RESPONSE, and also asynchronous communication.

The application-level overlay in the virtual network of a services network 20, 23 may be implemented using application level routers, such as XML routers. Application level routers communicate with each other and client gateways at the application layer, but using underlying normal networking facilities. Overlay networks typically use reliable point-to-point byte streams, such as Transmission Control Protocol (TCP), to implement reliable multicast. Building the services network 20 as an overlay allows the services network 20 to be modified and deployed relatively easily in comparison with conventional private network service sharing techniques. An overlay services network is also an effective way to build a robust mesh that can effectively route XML packets.

Those skilled in the art to which the present invention pertains will be familiar with many different types of communication network on which an application layer network may be overlaid. The present invention is not in any way limited to any particular type of underlying communication network.

It should also be appreciated that embodiments of the invention may be implemented using lower-layer techniques instead of as an overlay network. An overlay network architecture is one example of a possible implementation of the services network 20.

In operation, the services network 20 enables network services provided by either one of the enterprise systems 12, 22 to be made accessible to users in the other enterprise system, and to other members of the services network 20, such as the mobile end user system 13. The service implemented by the services network 20 is supported by two distinct types of network elements, the client gateways 16, 26 and the network controller 28, which respectively support communication protocols and management functions.

The framework of the services network 20 may be divided into three areas, including communication protocols, service description, and service discovery. In one embodiment, the service network 20 uses existing standards and specifications which have been developed for each of these areas.

For example, in the area of communication protocols, SOAP is one standard protocol which may be used to transport web services messages between a web client and a web server application. SOAP also provides for transfer of additional information relating to routing and security mechanisms being used.

Web Services Description Language (WSDL) is an XML-based language that provides a description of web services messages, and represents an example of a standardized approach to network service description.

These web services protocols (SOAP and WSDL) provide the capabilities and messaging facilities to bind and execute functionality anywhere, on any platform, without the need for custom code.

One well known service discovery mechanism is Universal Description, Discovery, and Integration (UDDI). UDDI enables enterprises and applications to quickly find web services over the Internet and allows operational registries to be maintained. UDDI lists available web services from different companies, gives their descriptions, location, services descriptions, associated access lists and security levels.

Other web services standards which are referred to herein and may be used in implementing embodiments of the invention include standards relating to reliable messaging (WS-Reliability), policy (WS-Policy), and federated identity (WS-Federation).

Although the above specifications and standards are well known, the use of these standards to provide a network of services in accordance with embodiments of the invention is not known.

As described briefly above, the client gateways 16, 26 are service delivery points for clients of the virtual extranet service provided by the services network 20. The client gateways 16, 26 also provide secure access to the private extranet service, protecting both the provider of the service and the client, the enterprise systems 12, 22 and the mobile end user system 13 in FIG. 1.

Communications between the client gateways 16, 26 through the services network 20 are preferably secure. Standards-based security techniques such as WS-Security, XML-Encryption, and XML-Signature may be used to provide secure communications while leveraging existent enterprise ingress and egress certificates which would normally already have been established for the enterprise systems 12, 22 and possibly the mobile end user system 13. These standards-based techniques, as well as other techniques which will be apparent to those skilled in the art, ensure that authorized service consumers in the enterprise systems 12, 22 and the mobile end user system 13 can participate in the virtual extranet services network 20.

The client gateways 16, 26 also classify and split incoming communication traffic data into control traffic to be forwarded to the network controller 28 and data traffic to be forwarded towards a destination through the components 18.

In general, a potential consumer of a network service, such as a web service application, can only make use of a network service which is known to exist. It is thus desirable for a network service provider to communicate the existence of a network service to potential consumers. This may be accomplished by publishing network services to registries, for instance. In the system 10 of FIG. 1, the client gateways 16, 26 allow the enterprise systems 12, 22 to publish their respective internal network web services to the services network 20. The client gateways 16, 26 also allow the enterprise systems 12, 22 and the mobile end user system 13 to consume external network services provided by other members of the services network 20.

As disclosed in further detail herein, the extent to which the services provided by an enterprise system 12, 22 are made available to other members of the services network 20 may be controlled by the client gateway 12, 22 and the network controller 28.

Network service providers may thus publish internal network web services to the services network 20 for use by other members of the services network 20. In many implementations, the services network 20 and each enterprise system 12, 22 are expected to be secure private networks, and communications on the connections 14, 15, 24 are also secure. This may be accomplished using secure tunneling techniques, examples of which will be readily apparent to those skilled in the art. Secure communications at both access and network sides of the client gateways 16, 26 provide a level of assurance that private network services available to members of the services network 20 are provided only by members of the services network 20 and can only be consumed by members of the services network 20.

Since communications with the services network 20 by network service providers and consumers traverse the client gateways 16, 26, the client gateways 16, 26 may also capture comprehensive audit records which may be used locally and/or by the network controller 28 to maintain regulatory and policy compliance, for example. Audit records may also or instead be used by other components or systems, such as a billing system with microbilling capabilities for according service charges to consumers.

The network controller 28 provides the central control plane functions for the services network 20, and thus implements the functionality of a network services manager with a main responsibility of maintaining a network services global repository. Like the client gateways 16, 26, the network controller 28 may be implemented as a high-performance hardware-based device with standard-based software for deployment by a services network provider. It is used for managing the virtual extranet service of the services network 20, to secure, manage, provision, and enforce policies for end-to-end network services applications and also to display and manage the list of available network services. While the network controller 28 is the services network management entity, the client gateways 16, 26 enforce policies and security rules on the actual data. Data traffic traverses a provider's core network, as represented at 18 in FIG. 1, through the client gateways 16, 26, and the network controller 28 processes control and management traffic.

The network controller 28 preferably implements at least a subset of core functions, including network web services storage and management of information such as location, ownership, access level groups, services lists, and other basic characteristics of network services, central policy repository and rights management, security specifications, SLA requirements such as hard Quality of Service (QoS) requirements suitable for end business to end business transactions for instance, and additional repositories for things such as client profiles, transaction auditing services, logs, etc.

To be able to offer end-to-end transaction security, reliability of message transport, and identity management, network service providers and services network providers would normally have to meet on middle ground to offer one set of combined management functions. The network controller 28, in conjunction with the client gateways 16, 26, may take the burden off the enterprise systems 12, 22 by replacing each enterprise's private management methods and tools with standard-based proxy modules offering the same functions at the edge of the services network 20.

The network controller 28 may also allow some security functions to be delegated to the extranet service, by freeing the local enterprise applications from providing certain security aspects like identity provider service, XML digital signature validation service, XML schema integrity, etc. By using the virtual extranet service, application integration within and between enterprises becomes easier and more efficient, end consumer business applications become more visible, and the costs and complexity associated with addition of partners to an enterprise system are reduced.

The network controller 28 also manages the procedure to securely provide the list of internal network services within the services network 20 to all or selected members of the services network 20.

Operation of the client gateways 16, 26 and the network controller 28 are described in further detail below with reference to FIGS. 2 and 3.

Figure 2:
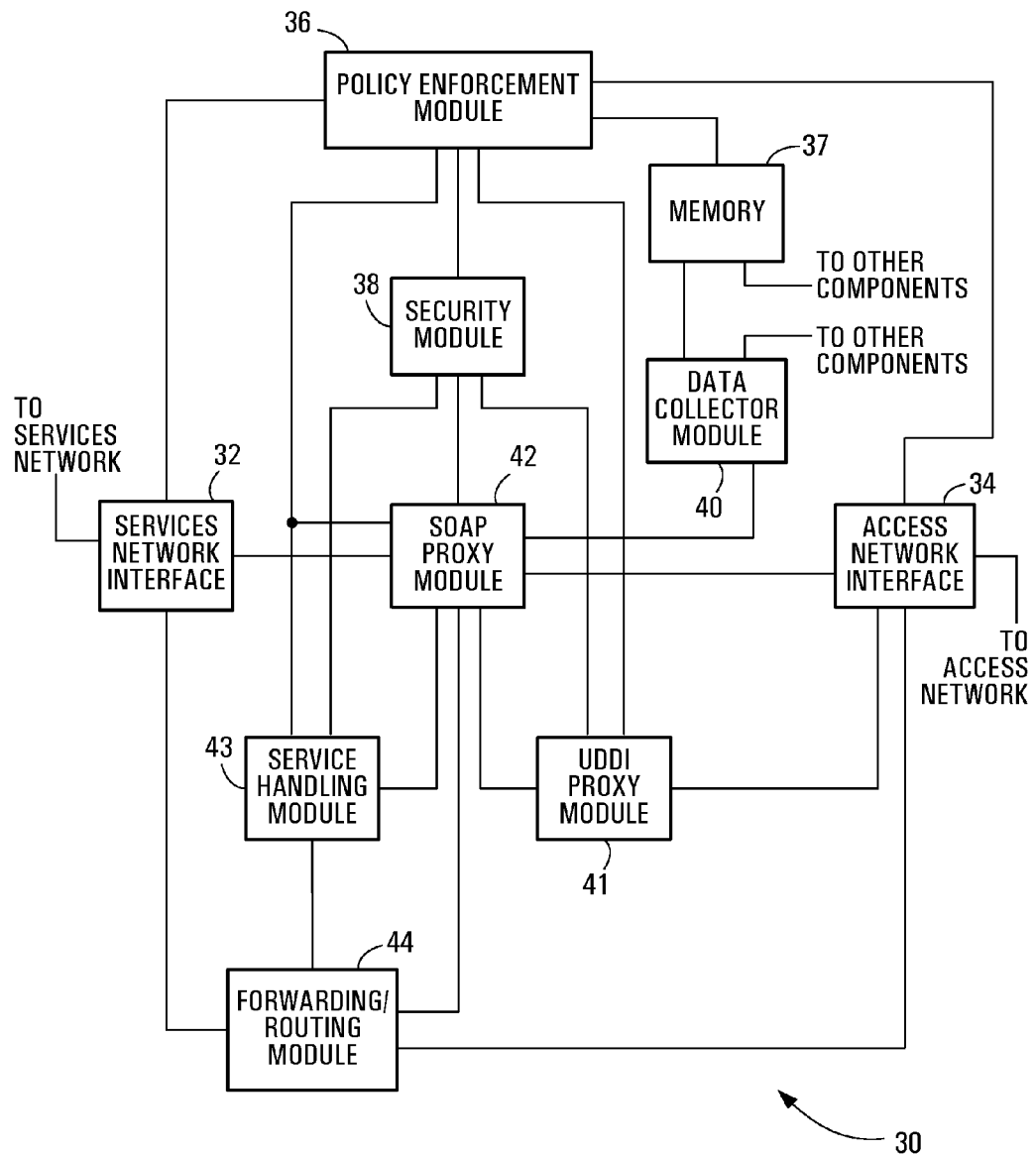
FIG. 2 is a block diagram of an example client gateway.

Considering first the client gateways 16, 26, FIG. 2 is a block diagram of an example client gateway. The client gateway 30 includes a services network interface 32, an access network interface 34, a policy enforcement module 36 operatively coupled to the interfaces 32, 34 and to a memory 37, a security module 38 operatively coupled to the policy enforcement module 36 and to the memory 37, a SOAP proxy module 42 operatively coupled to the interfaces 32, 34, to the policy enforcement module 36, to the security module 38, and to the memory 37, a data collector module 40 operatively coupled to the SOAP proxy module 42 and to the memory 37, a UDDI proxy module 41 which is operatively coupled to the policy enforcement module 36, to the security module 38, to the SOAP proxy module 42, and to the access network interface 34, a service handling module 43 operatively coupled to the policy enforcement module 36, to the security module 38, and to the SOAP proxy module 42, and a forwarding/routing module 44 operatively coupled to the services handling module 42, to the services network interface 32, and to the to the access network interface 34. Although such connections are not explicitly shown in FIG. 2 to avoid congestion, it should be appreciated that any or all of the other components of the client gateway 30 may be operatively coupled to the memory 37 and/or to the data collector module 40.

The access network interface 34 represents a remote access point through which the client gateway 30 connects to an enterprise system or other form of network service provider or consumer. Although labelled as an access network interface in FIG. 2, network service providers and consumers need not necessarily communicate with client gateways through network connections. It should therefore be understood that the interface 34 provides an interface to a member of a services network through an access connection, which may or may not strictly be a network connection.

The structure and operation of the access network interface 34 will be dependent upon the type of connection over which the client gateway 30 communicates with its client. In general, an access network interface 34 would include physical components which exchange communication signals with a communication medium, and hardware- and/or software-implemented components which generate and process the communication signals. Various implementations of such an interface will be apparent to those skilled in the art.

According to one embodiment, the access network interface 34 performs security tunnel termination for clients attempting to connect into services network 20 (FIG. 1). Virtual Local Area Network (VLAN) tunneling, Point-to-Point Protocol (PPP), Multi-Protocol Label Switching (MPLS), and IP Security (IPSec) are all examples of protocols which may be used by the access network interface 34 to communicate with a client. Other protocols and communication schemes will be apparent to those skilled in the art.

The memory 37 may include one or more memory devices, such as solid state memory devices, for storing information. Other types of memory device, including memory devices for use in conjunction with movable and/or removable storage media, and multiple memory devices of different types, may also be provided as the memory 37. The type of memory device or devices implemented as the memory 37 in the client gateway 30 is a matter of design, and will be dependent upon the particular type of equipment in which the client gateway 30 is implemented. A circuit card for communication equipment, for example, would normally incorporate volatile and non-volatile solid state memory devices as the memory 37.

As will become apparent as the present description proceeds, the information stored in the memory 37 may be used by the functional components of the client gateway 30 in performing their respective functions. Any or all of the functional components 36, 38, 40, 41, 42, 43, 44 may access information stored in the memory 37. Similarly, although no connection between the memory 37 and the interfaces 32, 34 has been shown in FIG. 2 to avoid congestion, these interfaces or internal components thereof may also interact with the memory 37.

Some or all of the functional components 36, 38, 40, 41, 42, 43, 44, as well as internal functions or components of the interfaces 32, 34, may be implemented as software, which might also be stored in the memory 37.

The form of the internal connections between components of FIG. 2 would be dependent upon the particular type of equipment in which the client gateway 30 is implemented. Internal bus structures, for example, are often used in electronic devices, although other types of connection may be used in addition to or instead of an internal bus. It should also be appreciated that interconnections need not necessarily be via a physical medium, as in the case of software-based implementations for instance.

Functional components which implement services network functions of the client gateway 30 have been shown in somewhat more detail than access-side functions in FIG. 2, as embodiments of the invention relate primarily to functions which are performed on the services network side of the access network interface 34. For example, whereas the access network interface 34 provides security functions for access connections, a security module 38 which provides network-side security functions has been shown separately from the services network interface 32 in FIG. 2. Other network-side functional components have similarly been shown separately in FIG. 2 for illustrative purposes.

This representation of separate functional components in the client gateway 30 is not intended to limit the present invention. The network-side functions a client gateway may be implemented using further or fewer components than explicitly shown in FIG. 2, possibly with different interconnections. For example, functions of the policy enforcement module 36 could be incorporated into each component which applies policies. Security policies could be both managed and applied by the security module 38 for instance.

In software-based embodiments, functions may be implemented in respective software modules or combined into fewer software modules for execution by a single hardware component, namely a processor such as a microprocessor, an Application Specific Integrated Circuit (ASIC), a Digital Signal Processor (DSP), or a microcontroller. Software might instead be executed by multiple hardware components, a microprocessor and a DSP or a network processor plus several ASICs and FPGAs for instance. Combined implementations in which some functions are implemented in software and others are implemented in hardware, which tends to operate faster than software, are also contemplated.

Accordingly, functions may be divided or integrated in a different manner than shown in FIG. 2, and any of the functional modules described herein may be implemented in software, hardware, or some combination thereof.

The policy enforcement module 36 implements services network policy enforcement for network services as configured by services network clients in their client profiles and advertised in their services' descriptions to the network controller 28.

Policy assertions that specify traditional requirements and capabilities that will ultimately manifest on the wire, such as an authentication scheme required for a specific customer and/or transport protocol selection for instance, are implemented in the client gateway. Therefore, these policies assertions are downloaded from a network controller into client gateways and enforced by the policy enforcement module 36.

Authentication and authorization of network service providers and consumers, administration and verification of transactions involving network services, and ensuring privacy and integrity of communication traffic associated with network services are examples of functions which may be involved in enforcing policies by the policy enforcement module 36 in conjunction with other components. The policy enforcement module 36 may interact with the security module 38, for example, for authentication such as by verifying a message digital signature. Thus, enforcement of security policies may involve both the policy enforcement module 36, which manages the policies, and the security module 38, which actually applies the policies by authenticating clients and possibly passing or dropping communication traffic, for example.

It should therefore be appreciated that the policy enforcement module 36 need not itself actually apply the policies it manages for enforcement. Interaction between the policy enforcement module 36 and other components to apply policies to services network clients and transactions will become apparent as the present description proceeds.

Through the policy enforcement module 36 at the client gateway 30, client authentication with the virtual extranet service is provided, rather than with each specific network web service as happens with current enterprise-centric network services. A network service consumer in a network service provider system with which the access network interface 34 communicates are clients of the client gateway 30, and gain access to network services across a services network through a single sign-on with the client gateway 30. The client gateway 30 thus removes the per-service authentication burden from its clients. Information to be used in client authentication is an example of one type of information which may be stored in the memory 37, preferably in a secure memory device or area.

For the case when a client XML digital signature is not present, the policy enforcement module 36 may cooperate with the security module 38 to generate a security assertion in accordance with what the end network service expects in terms of security assertions. The new security assertion is attached to service messages to assert the identity of the client and the integrity of the message.

When the client's identity "preference" is present but is different from the network service's "preference" the policy enforcement module 36 may cooperate with the security module 38 to map a specific digital certificate, illustratively an X.509 certificate into a different security assertion, such as a Security Assertion Markup Language (SAML) assertion.

Well known mechanisms drawn from standards such as SAML, WS-Federation, and WS-Trust are preferably used for these functions.

In one embodiment, the policy enforcement module 36 offers hardware implementation of federated identity, access control, and enforcement of policies that have been set up in advance using the network controller 28 (FIG. 1). Federated identity allows users to create and authenticate a user identity and then share the identity between domains and service providers without centrally storing personal information.

SLAB, tailored for web services operations, may also be in place for either or both of access-side and network-side communication links through which the client gateway 30 communicates with its clients and a services network. The policy enforcement module 36 may also monitor communication traffic levels to enforce SLA-related parameters, which may be stored in the memory 37.

As described briefly above, the virtual extranet services network according to an embodiment of the invention is XML-standard based, and accordingly the policy enforcement module 36, in conjunction with the service handling module 43 described below, may also enforce XML message header and message payload transformations for ingress data traffic received from clients of the client gateway 30 through the access network interface 34. Transformations may also be made from other message formats into XML-standard based network service messages. Inverse transformations, as well as transformations between non-XML formats used in access networks and services networks are also contemplated.

The security module 38 implements security standards to guarantee the security of communications over the services network. In some embodiments, the security module 38 uses web services standards-based tools such as WS-Security, XML-Encryption/Description, and XML-Signature to provide secure datapaths between services network members. These tools allow the client gateway 30 to leverage existent security protocols to ensure that authorized service consumers can participate in an end-to-end private business network. The security module 38 thus represents, in some embodiments, a central certificate and key management service for an enhanced over the core extranet service. The security module 38 provides security functions to all other modules of the client gateway 30, and specifically to the policy enforcement module 36, the UDDI proxy module 41, the SOAP proxy module 42, the service handling module 43, and both network interfaces 32, 34. These functions may include any or all of verification of signatures, encryption, decryption, signing, and exchanging of symmetric or asymmetric keys using protocols that are well known in the field of telecommunications security.

The SOAP proxy module 42 performs SOAP header handling for incoming and outgoing messages between clients and the services network. The SOAP proxy module 42 is a host that has two service addresses in two network interfaces: the access network 34 interface and the services network interface 32. As far as clients in the access network are concerned, all services advertised to the client by the services network appear to be offered from the SOAP proxy module 42.

Messages from either of the two connected networks are addressed to the SOAP proxy module 42, which receives SOAP messages, performs such functions and modifications as header handling, and relays the messages to the appropriate processing facility, the UDDI proxy module 41 or the services handling module 43. Also, messages from the UDDI proxy module 41 and the service handling module 43 are sent to the SOAP proxy module 42. Messages received from the UDDI proxy module 41 or the service handling module may be processed by the SOAP proxy module 42 to append Uniform Resource Identifier (URI) addressing information for instance. The SOAP proxy module 42 also interacts with the policy enforcement module 36 and the security module 38 to implement the network service policy on the outgoing message, and then sends the message on the appropriate interface. Policy enforcement, security, access control, auditing, and other functions associated with other modules of the client gateway 30 may thus be triggered by the SOAP proxy module 42 for each message.

To illustrate the operation of the SOAP proxy module 42, consider the following illustrative example: A service offered by one enterprise EB to another enterprise EA is proxied by the client gateway associated with EA to appear as if offered from a URI of the SOAP proxy module SPA of the client gateway. A service request from enterprise EA for a service offered by enterprise EB is sent to the SOAP proxy module SPA, which applies a set of functions and passes the message to the services handling module 43. Upon processing the service request, the services handling module 43 passes the message to the SOAP proxy module SPA, which appends the SOAP source and destination URIs SPA and SPB respectively, where SPB is the SOAP proxy module associated with the client gateway of enterprise EB. The request is then sent from SPA to SPB.

SOAP proxy module SPB further manipulates the SOAP source and address URIs of the message to SPB and EB before forwarding the request to enterprise EB. In the reverse direction, similar modifications are applied to the response. The SOAP URI is manipulated in such a way to store both the service URI and the SOAP proxy of the gateway associated with that service.

The SOAP proxy module 42 classifies and splits incoming traffic into UDDI control traffic to be forwarded to the UDDI proxy module 41 and data traffic, illustratively XML traffic, to be forwarded to the services handling module. Traffic classification may involve deep packet inspection, for example.

Although not explicitly shown in FIG. 2 to avoid congestion, a traffic classifier of the SOAP proxy module 42 may be operatively coupled to either the services network interface 32 or to another interface which supports communications with a network controller, to provide for exchange of control and/or management traffic with a network controller. It should also be appreciated that the SOAP proxy module 42 may receive control and/or management traffic from a network controller.

The UDDI proxy module 41 acts as an access point into a UDDI central repository hosted by the services extranet network, for all UDDI Publish requests received from clients trying to publish new web services or subscribe to published changes of existent web services, and as a proxy module, for all UDDI inquiry requests received from clients initiating 'find service' operations. Client access to network services is controlled, as disclosed herein, in accordance with network service policies. These policies may be enforced by the policy enforcement module 36 itself or in conjunction with the UDDI proxy module 41 to restrict the network services for which information is returned to a client system responsive to a find service or analogous operation.

The UDDI proxy module 41 expects ingress UDDI-based messages. All other messages that are not UDDI-framed may be discarded by the UDDI proxy module 41.

The UDDI proxy module 41 may cache UDDI entries locally at the client gateway level. This allows the UDDI proxy module 41 to perform local entry lookup and resolution when new UDDI inquiry requests are received. If a UDDI entry is locally found, then a UDDI response message is generated and sent back towards the client requesting the service.

If no UDDI entry is locally found, then a UDDI inquiry message is sent to the network controller, for a global look-up into the UDDI global repository. Once the entry is resolved by the network controller, a UDDI response is sent back to the same client gateway from where the request came. The client gateway 30 may learn and store the UDDI information for further UDDI lookups.

Thus, the UDDI proxy module 41 may handle local and remote resolution of service requests.

The service handling module 43 receives service messages from the SOAP proxy module 42, handles the service messages, and sends service messages to the SOAP proxy module 42. One primary function of the service handling module 43 is to process data traffic associated with a network service and being exchanged between the network service provider and consumer. In one embodiment, for example, service messages coming from the access network through the SOAP proxy module 42 are sent to the service handling module 43, which parses and modifies the messages to adapt them to the services network addressing and formatting rules. Formatting rules may be specified in a services network transform policy managed by the policy enforcement module 36, for example. The service handling module 43 then sends a corresponding service message to the client gateway associated with the network service provider through the SOAP proxy module and across the services network.

The forwarding/routing module 44 preferably performs forwarding/routing decisions (Layer1 or Layer2 forwarding, IP and/or XML routing), towards destinations within the services network. Although this module 44 may have the ability to handle IP traffic, complete with DNS lookups when necessary, as well as networking at the XML level, other embodiments may provide only one, different, or possibly additional routing mechanisms.

When application layer routing is provided, the basic functionality of the module 44 is to provide content-based routing for the service handling module 43. The service handling module 43 may use the forwarding/routing module 44 to identify SOAP endpoints for a published message. An example embodiment of the SOAP proxy module 42, the service handling module 43, and the forwarding/routing module 44 provides necessary mechanisms for publish-subscribe style networking.

An application routing layer of the forwarding/routing module 44 is optional and is best suited to support notification and event distribution type services. In one embodiment, the application routing layer stores client subscriptions in a subscription database, and upon reception of an XML multicast document that matches a set of entries in the subscription database, uses these entries to identify the next SOAP endpoints that require the document and forwards the document to those endpoints through the SOAP proxy module 42. The subscription for documents and publication of documents follow standardized mechanism outlined in the WS-Notification and WS-Eventing recommendations.

The services network interface 32 provides at least a physical interface to a services network. The type and structure of the services network interface 32, and other operations which may be performed on communication traffic which is exchanged with a services network, will be services network-dependent. Many examples of such network interfaces will be apparent to those skilled in the art.

The data collector module 40 gathers real-time management and billing information, which may be processed locally and/or forwarded to a network controller or other component for further storage and processing.

Once all operations are executed successfully at the policy enforcement module 36 and a security enforcement point in the security module 38, secure client identity and message integrity can be guaranteed within the services extranet network.

At this point, the data collector module 40 can pull real-time information for various management and billing operations. Data may be collected for activities like transaction auditing, performance auditing, event monitoring, transactional end-to-end business activity monitoring (transaction completion/failure), activity logs, SLA monitoring, warnings and errors thresholds, alerts, etc. The data collector 40 may collect information at any of various stages in a datapath, such as after the security module 38 to count packets discarded per security policy, at the policy enforcement level to compile statistics on discard policies, etc.

A client gateway such as shown in FIG. 2 may be configured to allow a network service provider to offer its services into a services network as local services, to allow a network service consumer to use network services which are available in the services network, or both. A client enterprise of the client gateway 30 may include both network service providers, in the form of enterprise application servers, and end user network service consumers.

When a client of the client gateway 30 has authenticated with the client gateway 30 and wishes to offer its network services into a services network, control traffic received from the client, illustratively through a secure tunnel terminated at the access network interface 34, is processed as described above, and forwarded to the network controller in the services network.

The level of availability of a network service in the services network may be determined on the basis of an explicit access control rule specified by the network service provider, or the network controller. A network service provider might request that a network service remain private, for use only by consumers within its own private enterprise system. Although not accessible to other members of a services network, restricting access to a private network service in a services network would allow a network service provider to take advantage of other functions of a services network, including policy enforcement and registry hosting for instance. Semi-private network services are also envisioned, in which a network service provider specifies particular services network members or groups to which a network service is to be made available. An unrestricted network service is accessible to all members of a services network.

Predetermined network service access controls may instead be configured at a network controller and applied to network services according to a type or class of a network service or a provider of the network service. All network services of a particular type or from a particular network service provider class might have the same predetermined access controls which are established when the network service provider first registers with the services network, for example. Another possible predetermined access control regime would make network services of a group of network service providers which have an existing business relationship available within only that group.

In a central policy management model, any access controls associated with a network service are stored as a service context or policy by the network controller. These policies are downloaded to each client gateway by the policy enforcement module 36 and applied to the data traffic as described above.

Regardless of the particular access control scheme used to establish and manage access controls for network services, offered network services are made available within the services network in accordance with any access controls for each network service. This may be accomplished in several ways. As described above, control traffic is forwarded to and processed by a network controller in the services network. In this case, the network controller may publish information for the network service in a global registry which is accessible to client gateways in the services network. Each client gateway then controls access to registered network services by its clients in accordance with policies associated with the network services.

The present invention in no way limited to the above examples of network service access controls. Access controls need not necessarily be implemented at all within a services network. In some embodiments, all network services offered within a services network are automatically available to all members of the services network.

A network service provider can preferably also modify policies of a network service, to change access controls for instance, in a substantially similar manner by exchanging control traffic with a network controller.

Once a client has been authenticated by the policy enforcement module 36 and the security module 42, the client can also or instead access network services available in a services network through the client gateway 30. The particular network services which a client is able to access are controlled in accordance with policies managed by the policy enforcement module 36. A global registry of the services network might include registry entries for network services which are not available to every client, as specified in network service policies stored by a network controller and downloaded to the policy enforcement module 36. Only those network services to which a client of the client gateway 30 is allowed access are made available to the client.

Data traffic which is subsequently exchanged between a client of the client gateway 30 and a remote network service provider through the services network is processed substantially as described above. Traffic destined for the remote network service provider from the client is processed based on security policies by the security module 38, modified in the SOAP proxy module 42 and handled differently based on the XML message type in the service handling module 43, and finally the data traffic is routed to the remote network service provider, or actually to the client gateway to which the remote network service provider is connected, by the routing module 44 through the services network interface 32.

Substantially similar processing is applied to data traffic associated with a network service provided by a client of the client gateway 30. Data traffic received from a remote network service customer through the services network interface 32 is processed, modified, and classified and handled as data traffic by the security module 38, the SOAP proxy module 42, and the service handling module 43. Received data traffic is then forwarded to the client by the access network interface 34.

Figure 3:
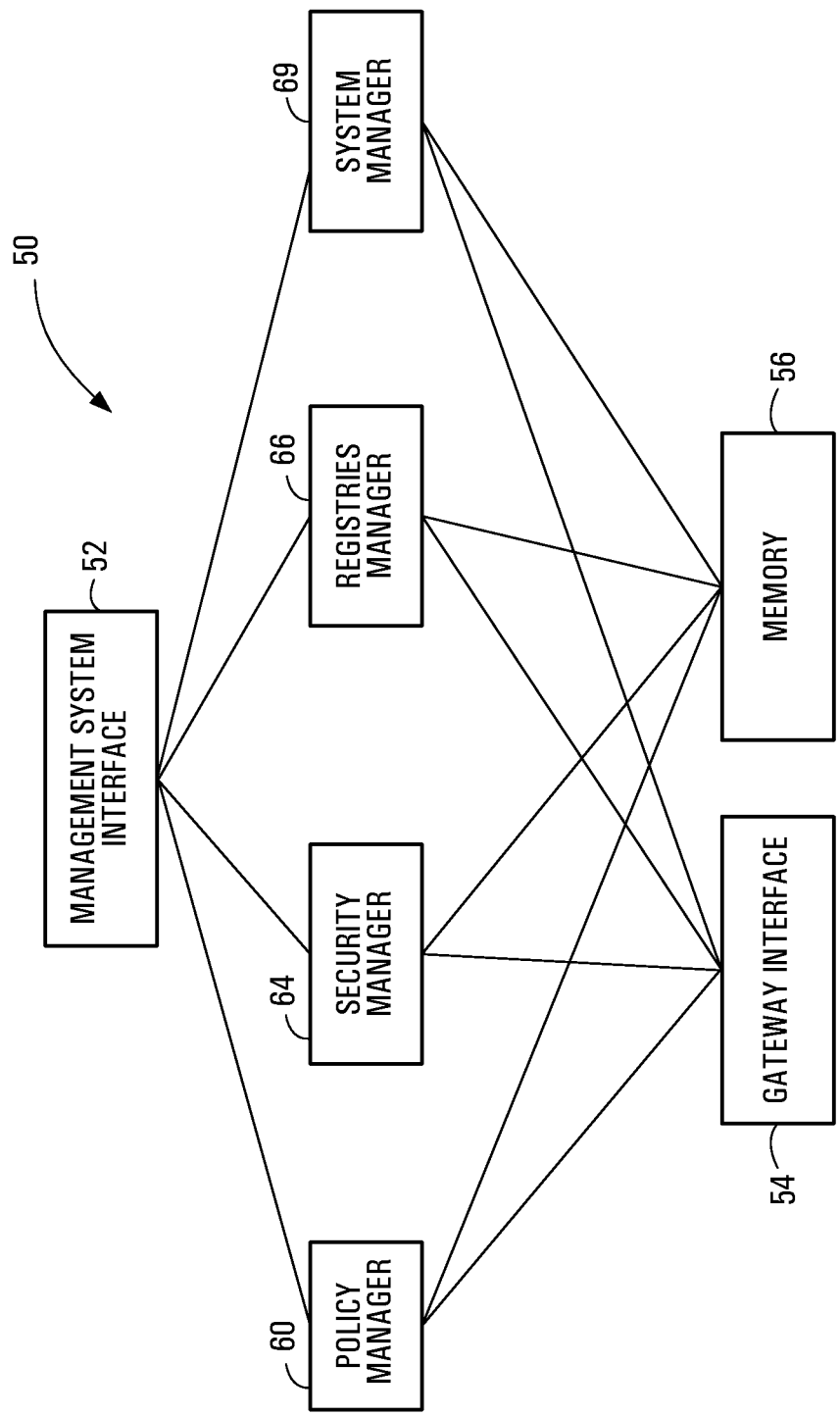
FIG. 3 is a block diagram of an example network controller.

Turning now to the network controller 28 (FIG. 1), FIG. 3 is a block diagram of an example network controller. The network controller 50 includes a management system interface 52, a gateway interface 54, and a memory 56 which are operatively coupled to managers 60, 64, 66, 69. The components of the network controller 50 may be provided in either a centralized architecture or a distributed and preferably centrally manageable architecture.

The management system interface 52 provides an interface to a management system, such as a Network Management System (NMS) for instance, which implements a central framework for configuration and management of a services network platform. The structure and operation of the management system interface 52 will be dependent upon the type of connection over which the network controller 50 communicates with its management system. In some embodiments, a network controller communicates with a management system through a managed communication network. Separate NMS management and control channels are also common. Examples of both types of management system interface, including interfaces using XML and interfaces which provide access to Management Information Bases (MIBs) for instance, will be apparent to those skilled in the art.

The gateway interface 54 represents an interface through which the network controller 50 communicates with client gateways. Although shown as a single component in FIG. 3, the gateway interface 54 may include respective interfaces, and possibly different types of interface, for communication with multiple client gateways. As described above with reference to FIG. 2, control traffic may be exchanged between a client gateway and a network controller through the services network, using a services network interface, or some other type of interface. The gateway interface 54 of FIG. 3 thus represents an interface which is compatible with an interface, either the services network interface 32 (FIG. 2) or another interface, provided at client gateways.

Like the interfaces described above with reference to FIG. 2, the management system interface 52 and the gateway interface 54 would generally include physical components which exchange communication signals with a communication medium, and hardware- and/or software-implemented components which generate and process the communication signals.

The memory 56 includes one or more memory devices for storing information. The information stored in the memory 56 may include information such as customer profiles and policies, security information, and access lists and access level groups per user per network service for use by components of the network controller 50, as well as registries information for access and use by other equipment in a services network. It should be appreciated, however, that the memory 56 may include both local and remote memory devices. Whereas network controller software is preferably stored locally, registries might be distributed and stored in a remote memory device which is accessible to both the network controller 50 and client gateways to which network service consumers are connected.

Some or all of the managers 60, 64, 66, 69, and internal functions or components of the interfaces 52, 54, may be implemented as software. Software implementing these managers and functions might also be stored in the memory 56.

The policy manager 60 provides comprehensive policy provisioning, definition and security policy management capabilities. Policy management is centralized by the policy manager 60, although the policies pieces of content and data may be stored in a distributed manner throughout the services network. Policy components, such as the policy manager 60 and a registry in the memory 56 in which policy information is stored for instance, may be distributed. Also, policies information is downloaded into the policy enforcement modules in client gateways. By utilizing a centralized approach to policy management for network services, a single set of policies can be managed by delegated administrators, in the services network provider's infrastructure. The policy manager 60 may be configured to automatically download or push policy information to client gateways, to transmit policy information responsive to requests from client gateways, or support both push and pull policy information transfer mechanisms.

According to one embodiment, the policy manager 60 manages network service policies using a network service policies registry. The network services policies registry is a collection of network service policies which establish access controls for all network services offered within a services network.

Each individual network service policy may specify privacy parameters, such as the authentication information which must be presented in a message, whether a message has to be signed and/or encrypted, which parts of a message are to be signed and/or encrypted, and how messages or parts thereof are to be signed and/or encrypted. These functions may be provided by implementing existent web services standards, like WS-Security, WS-Policy, WS-PolicyAttachment, WS-PolicyAssertions and WS-SecurityPolicy. There may also be rules indicating the levels of access to specific network services, illustratively private, semi-private/group, and public at the virtual extranet level. There may also be SLA agreements and QoS requirements for the end-to-end services, and lists and details regarding business partners involved in specific business transactions.

For any new network services providers or consumers joining a services network, consumer profiles and policies are preferably created at registration time. As described above, a network service provider publishes its network services within a services network by transmitting control traffic to a network controller through a client gateway. Policies received either from client gateways through the gateway interface 54 or from a management system through the management system interface 52 are centrally managed by the policy manager 60 within the virtual extranet service, but may be physically distributed within the virtual extranet provided by the services network.

Where a network service provider or consumer has its own service policies at the time of joining a services network, the policy manager 60 may allow enterprise service policies to be integrated into the services network's global policy registry. All management data at the extranet level may thereby be integrated with other data from enterprise management systems in order to create a globally-managed virtual extranet service.

The policy manager 60 also manages user authorizations and security profiles within the services network rather than with specific network service applications as is the typical scenario within an enterprise. A network service consumer in the enterprise space connects to the services network through a client gateway and does a single-sign-on with the services network. The centralization of access control information into one registry entity hosted by the network controller avoids the problem of sharing identity information and access control policies between enterprise systems. Instead, this data is stored within the virtual extranet.

The policy manager 60 may also accommodate legacy authorization systems, illustratively by offering the data necessary for translating existent proprietary session cookies into SAML assertions and real-world identities that can then be mapped to other identity repositories.

The policy manager 60 may specify message header and message payload transformations to be applied to data traffic by client gateways. In some embodiments, transformations are made between XML-based web service messages and other formats of messages in accordance with information, illustratively XML schemas, stored in a registry.

The security manager 64 manages the security of services network client communications through a services network. In one embodiment, the security manager 64 uses established network services and XML standards to guarantee secure communications. For example, a secure datapath created over the services network core may use WS-Security and XML-Encryption, as described above. Whereas client gateways actually establish secure connections through a services network, the security manager 64 provides a central certificate and key management service for the services network. Security information is downloaded to client gateways for use in establishing secure communications with other client gateways through the services network. Like the policy manager 60, the security manager 64 may be configured to automatically download or push security information to client gateways, to transmit security information responsive to requests from client gateways at runtime when client gateways require security information for network services transactions, or support both push and pull transfer mechanisms.

The registries manager 66 manages and sanitizes network service registries, illustratively industry standard registries such as UDDI, with advanced meta-data capabilities for network service location and management. The services network provider can store registry entries for available network services based on classification categories and branding they define, for example. In one embodiment, network services are organized in a registry according to permitted levels of access, which may include private, public, semi-private group, and/or others. As described above, some network services may be published privately to specific partners, while other network services are published publicly to the whole services network.

A network services registry managed by the registries manager 66 is a collection of network services from all network service providers connected directly or indirectly to a services network. For a new network service provider or consumer which does not have any registries capability at the time when it joins the services network, the registries manager 66 offers a full collections of network services, descriptions, locations, ownerships, and public APIs that allow a network service to be advertized and consumed. An enterprise may instead have its own registries at the time when it joins the services network, in which case the registries manager may allow the internal enterprise network services to be published into the services network's global network service registry.

Other meta-data registries may also be available for storing network services information for purposes other than basic network service location and management. These may include registries for use by other network controller components to manage service aspects such as timeouts, XML schemas to be applied, service contracts, QoS parameters, and subscription and addressing information. Additional registries may store collections of data obtained as a result of storing billing information, SLA monitoring information, transactional end-to-end business activity monitoring information, activity logs and performance auditing information, and exception alerts, for instance.

User credentials, general policies and security policies may be stored in the registries as well.

In some embodiments, clients of a services network have real-time console-access and management tools for real-time monitoring and querying of all registry information, in accordance with their service policy.

The system manager 69 receives audit records captured by client gateways to provide centralized control, monitoring, and auditing of transactions, events, warnings, and alerts, for instance, and may also manage delivery of comprehensive contracts and SLAB. Transaction priorities are preferably implemented based on their criticality. Other possible functions of the system manager 69 include reporting on transaction completions/failures and management of SLA contracts.

Figure 4:
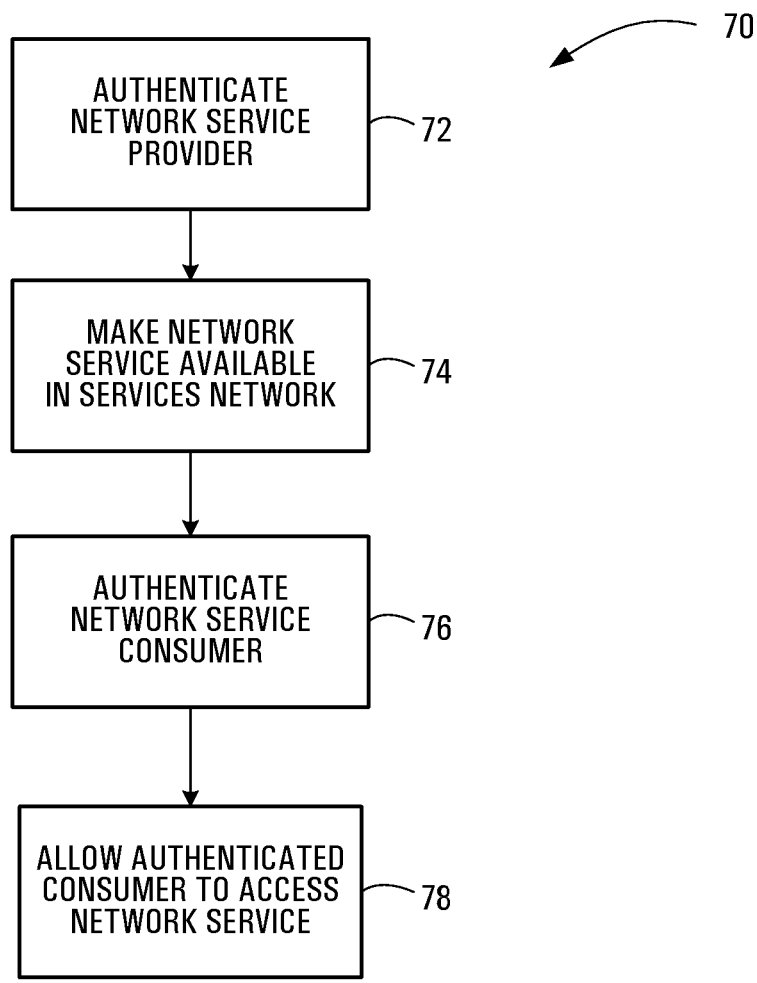
FIG. 4 is a flow diagram of a method according to an embodiment of the invention.

Embodiments of the invention have been described above primarily in terms of communication network equipment, namely the client gateway and the network controller. FIG. 4 is a flow diagram of a method according to an embodiment of the invention.

The method 70 begins at 72 with an operation of authenticating a client of a services network, in this case a network service provider. When the network service provider has been authenticated, a private network service provided by the network service provider can be published in the services network at 74.

Once the network service is available, a network service consumer authenticated at the same client gateway or at a different client gateway at 76 may be allowed to access the services network at 78 to use the network service.

The method 70 as shown in FIG. 4 is intended solely for illustrative purposes, and represents the situation of different clients offering and using a network service. More generally, an authenticated client of a services network may be allowed to make a private network service available to another client of the services network or use a network service provided by another client of the services network. The same client might thus be authenticated only once and subsequently allowed to perform multiple network service-related functions. Once a network service is made available by a client, the client may also change the privacy of the network service, such as to allow the network service to be used by another client of the services network.

Various manners of performing the operations shown in FIG. 4, as well as other operations which may be performed, will be apparent from the foregoing.

What has been described is merely illustrative of the application of principles of the invention. Other arrangements and methods can be implemented by those skilled in the art without departing from the scope of the present invention.

For example, a services network may include components other than those shown in FIG. 1, such as public network gateways and services network gateways disclosed in the related applications referenced above.

A services network may also include multiple network controllers. Different gateways may be connected to different network controllers. It may be desirable to configure one network controller as a designated network controller for some operations of the services network, such as maintaining a central services registry and communicating with services network gateways. A designated network controller might be the same as an ordinary network controller, but configured as a network controller through a command line interface (CLI) of an operator terminal through a management system interface 52 (FIG. 3), for example.

Where network services registries are maintained in multiple network controllers within one services network, the network controllers preferably communicate among themselves for exchanging control information about the services contained in each of their registries and about these services' local storage.

Therefore, a network controller may store into its registries information which has been provided to it by gateways and possibly other network controllers.

The example client gateway and network controller components shown in FIGS. 2 and 3 are similarly not restrictive. Embodiments of the invention may include fewer or additional components. A management system which communicates with a network controller may also communicate with client gateways for instance, even though no management system interface was shown in the example client gateway 30 of FIG. 2 to avoid congestion.

Network service providers and consumers have been described primarily herein as enterprise clients, but need not necessarily be associated with an enterprise. Embodiments of the invention may be implemented in conjunction with non-enterprise network service providers and consumers, such as the mobile end user system 13.

The present invention is also in no way restricted to any particular division of functions between a client gateway and a network controller. Functions may be distributed or integrated in a different manner than explicitly described herein. Registries, for example, could be stored by each client gateway instead of centrally.

In addition, although described primarily in the context of methods and systems, other implementations of the invention are also contemplated, as instructions stored on a machine-readable medium for instance.

We claim:

1. An apparatus for providing network services in a private services network, the apparatus comprising:
   a services network interface configured to enable communications between the apparatus and the private services network, the private services network allowing network services provided to users within respective private network service provider systems, which are clients of the private services network, to be made available through the private services network for use by users within other private network systems, which are clients of the private services network and are outside the private network service provider systems; and
   a policy enforcement module, operatively coupled to the services network interface, and configured to enforce rules for client access to the private services network in accordance with an authentication policy of the private services network and to allow a client that has been authenticated for access to the private services network to make a network service provided by the authenticated client available for use through the private services network, to use a network service provided by another client through the private services network, or to both make the network service provided by the authenticated client available for use through the private services network and use the network service provided by another client through the private services network.

2. The apparatus of claim 1, wherein the policy enforcement module is further configured to allow the authenticated client to make the network service provided by the authenticated client available for use through the private services network and to use the network service provided by another client according to respective service policies associated with the network services.

3. The apparatus of claim 1, further comprising:
   a security module configured to enforce secure end to end communication, between the authenticated client and the private services network, within the private services network and between the private services network and a destination client of the private services network.

4. The apparatus of claim 1, further comprising:
   a security module operatively coupled to the policy enforcement module and configured to apply authentication and authorization actions based on the rules to communication traffic, and to pass or drop the communication traffic responsive to the authentication and authorization actions.

5. The apparatus of claim 4, wherein the security module is further configured to apply security rules to communication traffic associated with the authenticated client.

6. The apparatus of claim 4, further comprising:
   a Simple Object Access Protocol (SOAP) proxy module operatively coupled to the security module and configured to classify traffic associated with the authenticated client as control traffic or data traffic, to transmit the control traffic comprising information associated with the network service provided by the authenticated client for publication in a services registry, and to modify SOAP information in the data traffic for further processing.

7. The apparatus of claim 6, further comprising:
   a Universal Description, Discovery, and Integration (UDDI) proxy module operatively coupled to the SOAP proxy module, wherein the SOAP proxy module is further configured to identify received UDDI control traffic, and to forward the received UDDI control traffic to the UDDI proxy module for further processing.

8. The apparatus of claim 7, wherein the received UDDI control traffic comprises requests for network services lookups, and wherein the UDDI proxy module is further configured to handle resolution of the requests and to respond to each request.

9. The apparatus of claim 7, wherein the policy enforcement module is configured allow the authenticated client to make the network service available through the UDDI proxy module by allowing the authenticated client to publish information associated with the network service to a services registry, and to allow the authenticated client to use a network service provided by another client by allowing the authenticated client to access the services registry.

10. The apparatus of claim 9, wherein the information associated with the network service comprises access information specifying access rules for use of the network service through the private services network, and wherein the policy enforcement module is further configured to allow the authenticated client to access information associated with the network service provided by another client of the private services network from the services registry through the UDDI proxy module in accordance with access rules specified for the network service provided by the other client of the private services network.

11. The apparatus of claim 7, further comprising:
   a service handling module operatively coupled to the SOAP proxy module and configured to exchange the data traffic with the SOAP proxy module.

12. The apparatus of claim 1, further comprising:
   a forwarding/routing module operatively coupled to the policy enforcement module and configured to route communication traffic in the private services network, the forwarding/routing module supporting at least one of: a layer 1 forwarding method, a layer 2 forwarding method, Internet Protocol (IP) routing, and eXtensible Markup Language (XML) routing.

13. The apparatus of claim 1, wherein the policy enforcement module is further configured to enforce a transform policy of the private services network, the transform policy specifying respective formats for transfer to the authenticated client and to the private services network.

14. A communication system for providing a private services network in which network services provided by network service providers are made accessible to network service consumers, the communication system comprising:
a plurality of client gateways to be operatively coupled to network service providers and network service consumers, each client gateway comprising the apparatus of claim 1; and
a network controller operatively coupled to each client gateway for managing policies enforced by the client gateways and a registry of the network services.

15. An apparatus for managing policies associated with network services available in a private services network, the private services network allowing network services provided to users within respective private network service provider systems, which are clients of the private services network, to be made available through the private services network for use by users within other private network systems, which are clients of the private services network and are outside the private network service provider systems, the apparatus comprising:
a client gateway interface to be operatively coupled to client gateways through which the clients of the private services network access the private services network; and
a policy manager operatively coupled to the client gateway interface and configured to distribute network service policies specifying access controls for respective network services to the client gateways through the client gateway interface to cause the client gateways to control access to the network services by the clients of the private services network in accordance with the network service policies.

16. The apparatus of claim 15, wherein the policy manager is further configured to manage at least one of: authentication of the clients with the private services network, and format transformations to be applied to data traffic by the client gateways.

17. The apparatus of claim 15, wherein the network service policies comprise network service policies stored in a network service policies registry, and wherein the policy manager is further configured to maintain the network service policies registry, and to integrate into the network service policies registry an existing network service policy received from a client of the private services network by which a network service is provided.

18. The apparatus of claim 15, further comprising at least one of:
a security manager operatively coupled to the client gateway interface and configured to manage security of client communications through the private services network;
a registries manager operatively coupled to the client gateway interface and configured to manage at least one of: a registry of network services available in the private services network, service timeout information, eXtensible Markup Language (XML) schemas, service contracts, Quality of Service (QoS) parameters, subscription information, addressing information, billing information, Service Level Agreement (SLA) monitoring information, transactional network service activity monitoring information, activity logs, performance auditing information, and exception alerts; and
a system manager operatively coupled to the client gateway interface and configured to receive and manage audit records captured by the client gateways.

19. A communication system for providing a private services network in which private network services provided by network service providers are made accessible to network service consumers, the communication system comprising:
a plurality of client gateways to be operatively coupled to the network service providers and the network service consumers for providing the network service providers and the network service consumers with access to the private services network; and
a network controller operatively coupled to each client gateway and comprising the apparatus of claim 15.

20. An apparatus for managing network services available in a private services network, the private services network allowing network services provided to users within respective private network service provider systems, which are clients of the private services network, to be made available through the private services network for use by users within other private network systems, which are clients of the private services network and are outside the private network service provider systems, the apparatus comprising:
a client gateway interface to be operatively coupled to client gateways through which the clients of the private services network access the private services network; and
a registries manager operatively coupled to the client gateway interface and configured to receive from the client gateways requests regarding information in a services registry and provide requested information responsive thereto, to receive from the client gateways information associated with a network service to be made available in the private services network and publish the received information in the services registry, and to receive from the client gateways subscriptions for the registries manager to send to the client gateways notifications of modifications to the information in the services registry associated with the network services and send notifications of the modifications to the client gateways responsive to the subscriptions.

21. A communication system comprising:
a network controller comprising the apparatus of claim 20;
a memory operatively coupled to the network controller for storing the services registry; and
a plurality of client gateways operatively coupled to clients of the private services network and to the memory, the client gateways being configured to control access to the network services published in the services registry by the clients.

22. A method of providing network services in a private services network, the private services network allowing network services provided to users within respective private network service provider systems, which are clients of the private services network, to be made available through the private services network for use by users within other private network systems, which are clients of the private services network and are outside the private network service provider systems, the method comprising:
enforcing rules for client access to the private services network in accordance with an authentication policy of the private services network;

authenticating a client of the private services network for access to the private services network; and allowing the authenticated client to make a network service provided by the authenticated client available for use through the private services network, to access the private services network to use a specific network service or group of network services provided by another client of the private services network, or to both make the network service provided by the authenticated client available for use through the private services network and access the private services network to use the specific network service or group of network services provided by another client of the private services network.

23. The method of claim 22, wherein allowing the authenticated client to make the network service provided by the authenticated client available for use through the private services network comprises:

initiating a connection with the private services network for services publication; and allowing the authenticated client to access the private services network comprises:

allowing the client to use a targeted network service by initiating a connection with the targeted network service and sending requests to and receiving replies from the targeted service.

24. The method of claim 23, wherein allowing the authenticated client to access the private services network further comprises:

allowing the client to consult a registry of network services to access information for the specific network service or group of network services or to subscribe to changes at the registry level for the specific network service or group of network services.

25. The method of claim 22, wherein allowing the authenticated client to make the network service provided by the authenticated client available for use through the private services network comprises:

allowing the authenticated client to make the network service available in the private services network in accordance with a service policy of the network service provided by the client, and wherein allowing the authenticated client to access the private services network comprises:

determining network services having associated service policies which permit use by the authenticated client.

26. A non-transitory machine-readable medium storing instructions which when executed perform the method of claim 22.

27. The communication system of claim 14, wherein the client gateways are implemented in edge routers of infrastructure of a provider of the private services network, and wherein the network controller comprises a dedicated card for the edge routers.

28. The communication system of claim 14, wherein the network controller comprises a dedicated XML appliance.

* * * * *